United States Patent
Tang et al.

(10) Patent No.: US 7,982,740 B2
(45) Date of Patent: Jul. 19, 2011

(54) LOW RESOLUTION GRAPHICS MODE SUPPORT USING WINDOW DESCRIPTORS

(75) Inventors: Chengfuh Jeffrey Tang, Saratoga, CA (US); Steven (Yao-Hua) Tseng, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 122 days.

(21) Appl. No.: 11/072,201

(22) Filed: Mar. 4, 2005

(65) Prior Publication Data

US 2006/0197771 A1    Sep. 7, 2006

Related U.S. Application Data

(63) Continuation-in-part of application No. 10/712,809, filed on Nov. 13, 2003, now Pat. No. 7,002,602, which is a continuation of application No. 09/437,348, filed on Nov. 9, 1999, now Pat. No. 6,700,588.

(60) Provisional application No. 60/107,875, filed on Nov. 9, 1998.

(51) Int. Cl.
*G06T 15/00* (2011.01)
(52) U.S. Cl. ........ 345/501; 345/419; 345/428; 345/619; 382/298; 382/299; 382/300

(58) Field of Classification Search .................. 345/419, 345/428, 619, 501; 382/298, 299, 300
See application file for complete search history.

(56) References Cited

U.S. PATENT DOCUMENTS

| 6,067,071 | A  | * | 5/2000  | Kotha et al.    | 345/698 |
| 6,130,660 | A  | * | 10/2000 | Imsand          | 345/698 |
| 6,670,964 | B1 | * | 12/2003 | Ward et al.     | 345/660 |
| 6,894,706 | B1 | * | 5/2005  | Ward et al.     | 345/660 |
| 7,002,602 | B2 | * | 2/2006  | MacInnis et al. | 345/629 |
| 7,071,939 | B2 | * | 7/2006  | Suen et al.     | 345/428 |

* cited by examiner

*Primary Examiner* — Phu Nguyen
(74) *Attorney, Agent, or Firm* — McAndrews, Held & Malloy, Ltd.

(57) ABSTRACT

Herein described is a method and system of displaying low resolution graphics onto a high resolution display. The low resolution graphics may be displayed using one or more displayable maps or surfaces, each of which is defined by way of one or more parameters. The display may comprise a monitor, television set, or set top box, capable of displaying at a particular resolution. In one or more representative embodiments, the various aspects of the invention permit scaling the low resolution graphics onto the high resolution display by way of using the one or more displayable maps or surfaces such that the graphics data is properly displayed on the higher resolution display.

25 Claims, 5 Drawing Sheets

Spatial Representation of a Typical N Line Display Area Specified by Using a Single Window Descriptor (e.g., N=240)

Figure 3

LOW RESOLUTION GRAPHICS MODE SUPPORT USING WINDOW DESCRIPTORS

CROSS-REFERENCE TO RELATED APPLICATIONS/INCORPORATION BY REFERENCE

The present application is a continuation-in-part of U.S. application Ser. No. 10/712,809, filed Nov. 13, 2003, now U.S. Pat. No. 7,002,602, which itself is a continuation of application Ser. No. 09/437,348, filed on Nov. 9, 1999 now U.S. Pat. No. 6,700,588. Application Ser. No. 09/437,348 makes reference to and claims priority to U.S. Provisional Patent Application Ser. No. 60/107,875 filed on Nov. 9, 1998.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

When a standard definition (SD) television or monitor displays graphics, it may typically display the graphics at a resolution of 640×480 (horizontal×vertical) pixels. In certain circumstances, the graphics may be designed for displaying using a low resolution television or monitor. However, when the television or monitor has a higher resolution compared to the graphics to be displayed, the graphics may not be displayed correctly. For example, when the graphics comprises a resolution of 320×240 pixels and the monitor used to display the graphics comprises a resolution of 640×480 pixels, the image viewed while using the monitor may be unacceptable.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Various aspects of the invention provide a system and/or method of displaying graphics data onto a display, substantially as shown in and/or described in connection with at least one of the following figures, as set forth more completely in the claims.

These and other advantages, aspects, and novel features of the present invention, as well as details of illustrated embodiments, thereof, will be more fully understood from the following description and drawings.

BRIEF DESCRIPTION OF THE DRAWINGS

FIG. 3 is a spatial representation of a typical N line display area that is specified using a single window descriptor.

DETAILED DESCRIPTION OF THE INVENTION

Various aspects of the present invention provide at least a system and method for displaying low resolution graphics data onto a display. The low resolution graphics data may be displayed using one or more graphics pixel maps or graphics pixel surfaces. Alternatively, each of the one or more graphics pixel maps or graphics pixel surfaces may be referred to as a window. The display may comprise a monitor, television set, or set top box, capable of displaying at a particular resolution, for example. In one or more representative embodiments, the display has a native pixel resolution that is higher than the pixel resolution of the one or more graphics pixel maps. In one or more representative embodiments, the various aspects of the invention permit scaling the one or more graphics pixel maps or graphics pixel surfaces such that it is properly displayed on the higher resolution display.

In a representative embodiment, the graphics pixel maps are designed for displaying at a resolution that is lower compared to the native resolution provided by the display. For example, a particular graphics pixel map or surface may be designed such that its pixel resolution is 320×240 pixels. However, the display may comprise a resolution of 640×480 pixels. The system that processes the 320×240 graphics pixel map such that it is properly displayed using a 640×480 pixel resolution display will be referred to as a "graphics support circuitry using window descriptors" (GSCWD). Vertical and horizontal scaling may be appropriately performed by the GSCWD such that the graphics pixel surface or graphics pixel map is properly scaled and displayed over the entire display.

Figure 1:
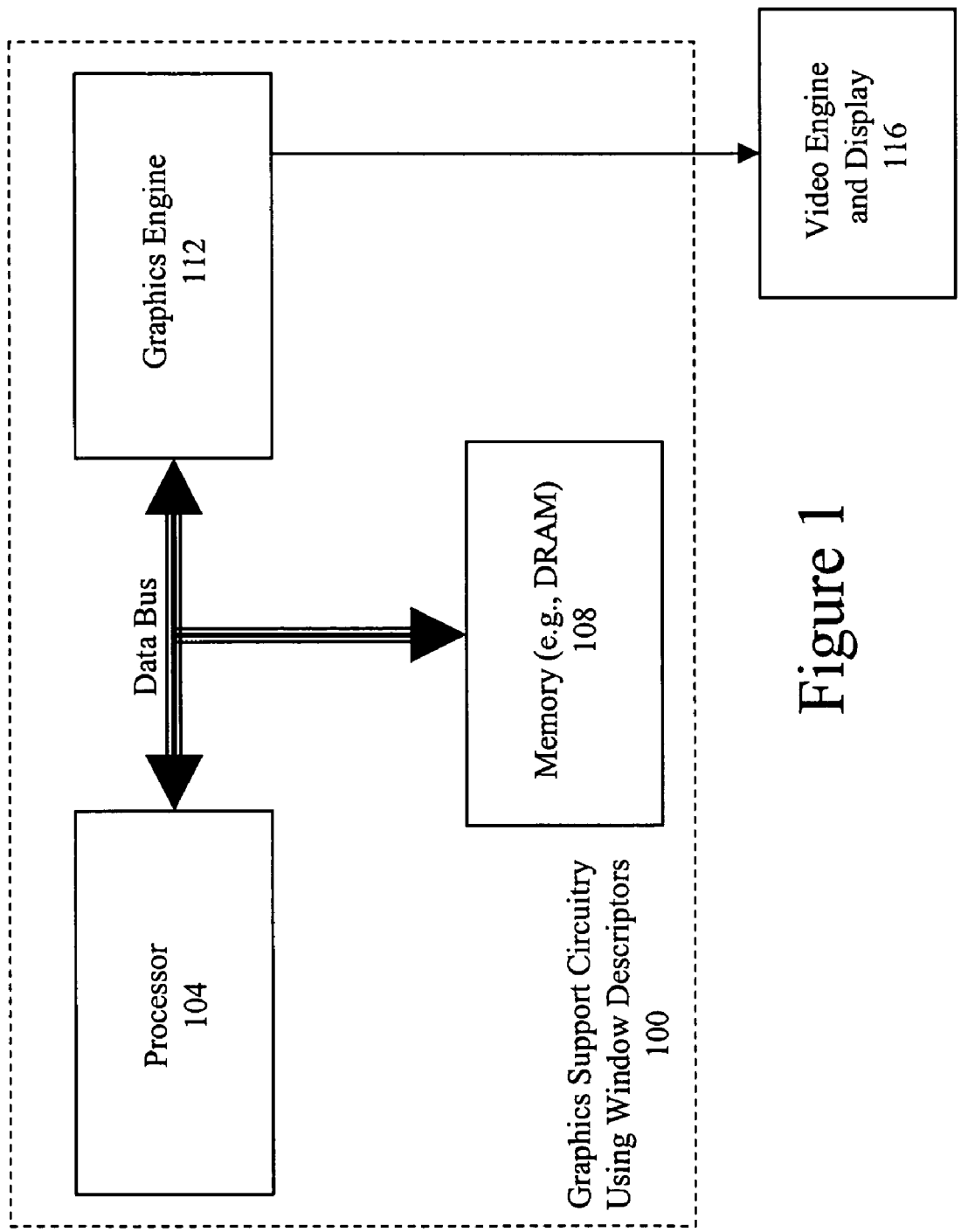
FIG. 1 is a system block diagram of the graphics support circuitry using window descriptors (GSCWD), in accordance with an embodiment of the invention.

FIG. 1 is a system block diagram of the graphics support circuitry using window descriptors (GSCWD), in accordance with an embodiment of the invention. The GSCWD comprises a processor 104, a memory 108, a graphics engine 112, and a video engine and display 116. As shown, the data bus acts as a medium for data communication between the components 104, 108, 112, 116 of the GSCWD. The processor 104 may comprise a central processing unit (CPU) used for executing one or more sets of instructions stored in the memory 108. The memory 108 may comprise a random access memory such as a DRAM, for example. The graphics engine 112 functions to process graphics data by processing one or more window descriptors that are stored in the memory 108. The one or more sets of instructions as well as the one or more window descriptors may be stored in the memory 108. Further the graphics engine 112 may perform sorting and blending of one or more graphics surfaces or graphics pixel maps prior to presenting the graphics data onto a video engine and display. The processor 104 executes one or more sets of instructions resident in the memory 108 that allow the graphics engine 112 to fetch one or more parameters of the one or more window descriptors. The graphics engine 112 may convert the graphics data into a common internal format such as YUV444, for example. It may utilize the common internal format to easily sort and blend one or more graphics pixel maps or surfaces together. The graphics engine 112 may provide scaling, anti-flutter filtering, and/or aspect ratio conversion functions. The graphics engine 112 utilizes the one or more parameters to properly process the graphics pixel maps such that it is properly presented to the video engine and display 116. The processing may include horizontal and vertical scaling of the graphics pixel data. Various aspects of the invention utilize the one or more window descriptors for performing the vertical scaling. The horizontal scaling may be performed using the on-chip circuitry of the graphics engine 112. The on-chip circuitry may comprise one or more line buffers. In a representative embodiment, the graphics engine 112 processes a graphics pixel map having a resolution of 320×240 pixels, such that it is properly displayed on a display having a resolution of 640×480 pixels. Because the invention is not so limited, the various aspects of the invention may be adapted for processing a graphics pixel map of a first resolution, such that the graphics pixel map is properly displayed on a display having second resolution. The second resolution may be greater than that of the first resolution, for example.

Processing of the graphics data may be accomplished using "window descriptors" that completely describe how the one or more graphics surfaces or graphics pixels maps or windows are presented on a display. A window descriptor comprises one or more parameters used to construct, compose, and/or describe (hence the term "descriptor" in "window descriptor") each of the one or more graphics surfaces (hence the term "windows" in "window descriptor"). A parameter of a window descriptor may indicate the location of a pixel within a particular display, for example. A parameter of a window descriptor may indicate a starting location or an ending location of a pixel, for example. A parameter of a window descriptor may indicate the layer number of a particular surface when one or more surfaces are used to formulate the video image to be displayed, for example. A parameter may specify one or more weighting factors that are used when one or more surfaces are blended together. More importantly, a parameter may determine the memory spacing between consecutive horizontal scan lines of a displayed graphics pixel map. The memory spacing between horizontal scan lines may be defined as "pitch". The pitch may be defined as the memory address difference between the first pixel of one horizontal scan line and the first pixel of the next horizontal scan line of a graphics pixel map or surface.

Figure 2:
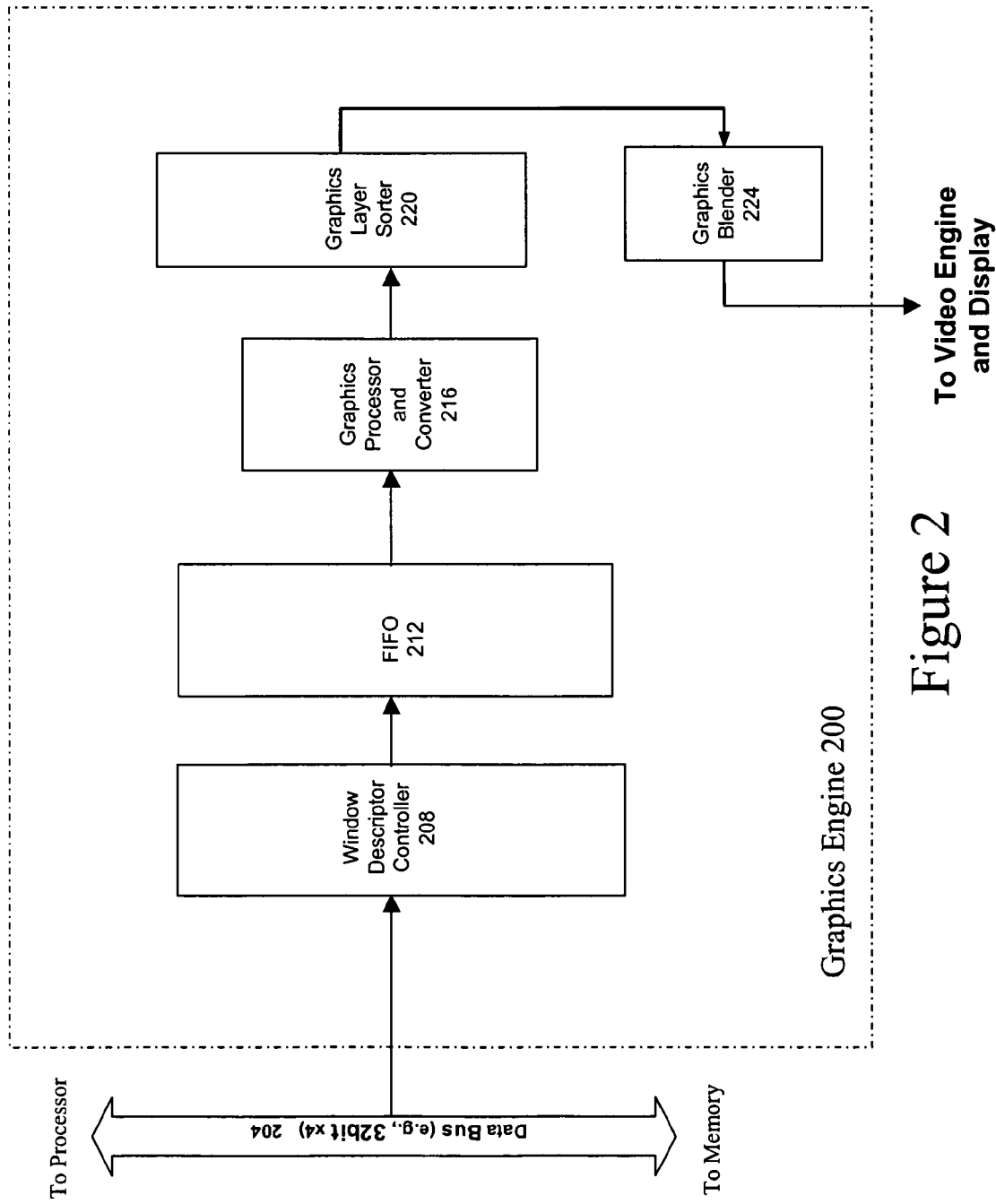
FIG. 2 is a system block diagram of a graphics engine in accordance with an embodiment of the invention.

FIG. 2 is a system block diagram of a graphics engine 200 in accordance with an embodiment of the invention. The graphics engine 200 may comprise a window descriptor controller 208, a first in/first out buffer (FIFO) 212, a graphics processor and converter 216, a graphics layer sorter 220, and a graphics blender 224. As shown, the graphics engine 200 interfaces with other components (memory and processor) of the GSCWD by way of a data bus. The window descriptor controller 208 appropriately receives instructions from the processor of the GSCWD. The window descriptor controller 208 may fetch one or more parameters of a window descriptor by accessing the memory of the GSCWD. The one or more parameters of a window descriptor may be used to specify or map a displayable area on a monitor or display. Graphics data (i.e. a graphics pixel map or surface) that is associated with the window descriptor may be displayed in the specified displayable area. The window descriptor controller 208 performs all graphics display controlling functions. The window descriptor controller 208 may load the one or more parameters into storage registers within the graphics engine 200. The window descriptor controller 208 may parse and sort the one or more parameters prior to transmitting them to the FIFO 212. The FIFO 212 is used for properly buffering the data prior to transmission to the graphics processor and converter 216. The graphics processor and converter 216 performs horizontal scaling and aspect ratio conversion, for example. The graphics layer sorter 220 may properly position or layer one or more graphics pixel maps or surfaces such that one or more graphics pixel maps may overlap each other. The graphics blender 224 may blend the one or more graphics pixel maps or surfaces by weighting each surface using a weight or coefficient, and may subsequently add the weighted surfaces together to create a composite surface. The graphics blender 224 outputs the blended surfaces into a video engine and display. The video engine and display may further blend the output with a background and may incorporate video data prior to displaying onto the display. As illustrated in FIG. 2, the graphics engine 200 communicates to a processor and a memory using the data bus 204. The data bus may comprise a 128 bit data bus that utilizes four 32 bit words.

FIG. 3 is a spatial representation of a typical N line display area or display field that is specified using a single window descriptor. The value of N may correspond to 240, for example, when a television displays a resolution of 320×240 pixels. A single window descriptor may be used to specify the display of all horizontal scan lines during a display period. A window descriptor stores one or more parameters (i.e., one set of parameters) used to effectuate the proper display of a window onto the display during the display period. The one or more parameters may comprise what is referred to as a "pitch". The value represented by the pitch is equal to the difference in memory addresses between the first pixels of consecutive horizontal scan lines. For example, the pitch may be computed by taking the difference between the address of the first pixel in a horizontal scan line and the memory address of the first pixel in the next consecutive horizontal scan line for a particular display period. The pitch may be represented by a data word that is represented using one or more bits. The pitch may itself be stored in memory and may be retrieved by way of one or more instructions executed by a processor. The one or more parameters may comprise memory start and end addresses of a window descriptor. A memory start or end address may refer to a pixel in a horizontal display line, for example. The memory start address may signify the beginning of a horizontal display line while the memory end address may signify the end of a horizontal display line. The one or more parameters may comprise a layer number of a window, when two or more windows (using one or more window descriptors) are overlapped or superimposed to create a displayed image. Additionally, the one or more parameters may comprise values that are used as weighting factors for determining the transparency or opaqueness for each window when two or more windows are overlapped to form a displayed image.

Figure 4:
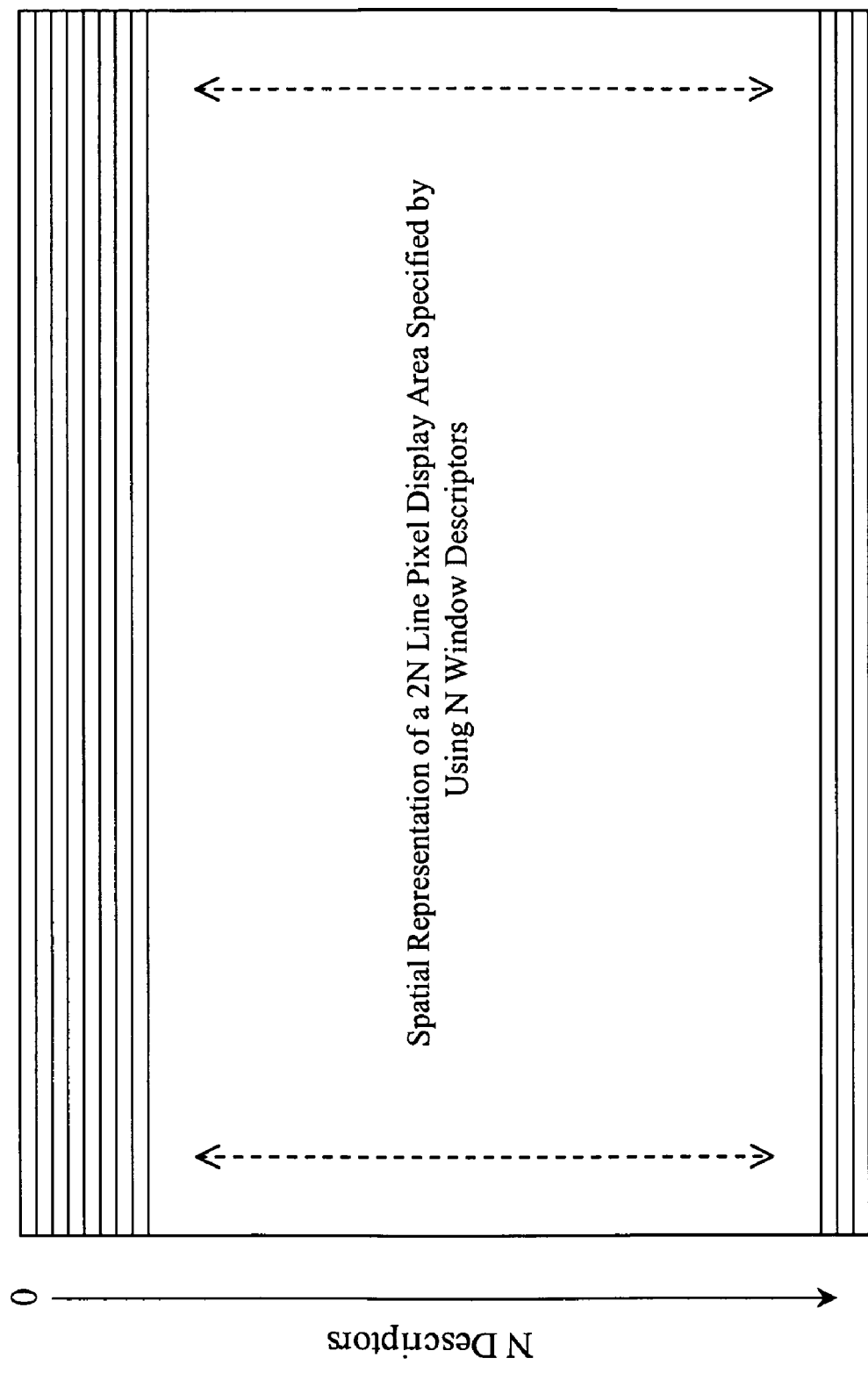
FIG. 4 is a spatial representation of N window descriptors used to specify a 2N line pixel display in accordance with an embodiment of the invention.

FIG. 4 is a spatial representation of N window descriptors used to specify a 2N line pixel display in accordance with an embodiment of the invention. As illustrated in FIG. 4, the single window descriptor represented in FIG. 3 is represented using N window descriptors. Each horizontal display line of the window in FIG. 3 is used to represent two horizontal lines by way of specifying a parameter of each of the N window descriptors. The parameter may be referred to as the pitch. The pitch may be set to a value such that the same line is displayed twice for each of the N window descriptors. The value of the pitch may be set to zero, for example. Effectively, this line doubling technique doubles the number of horizontal lines displayed. When N=240 for example, each of the 240 lines are repeated such that a total of 480 lines are displayed, resulting in a doubling of the number of horizontal scan lines. As a result, a 2× vertical scaling is performed. Hence, when displaying a field comprising 240 horizontal display lines, a single window descriptor (i.e., one graphics pixel map or surface) may be used. However, when displaying a field comprising 480 horizontal display lines, the various aspects of the invention employ the use of N=240 window descriptors (i.e., in this representative embodiment, 240 graphics pixel maps or surfaces are used). Each of the 240 window descriptors represents a successive horizontal display line of the previously mentioned 240-line single window descriptor.

Figure 5:
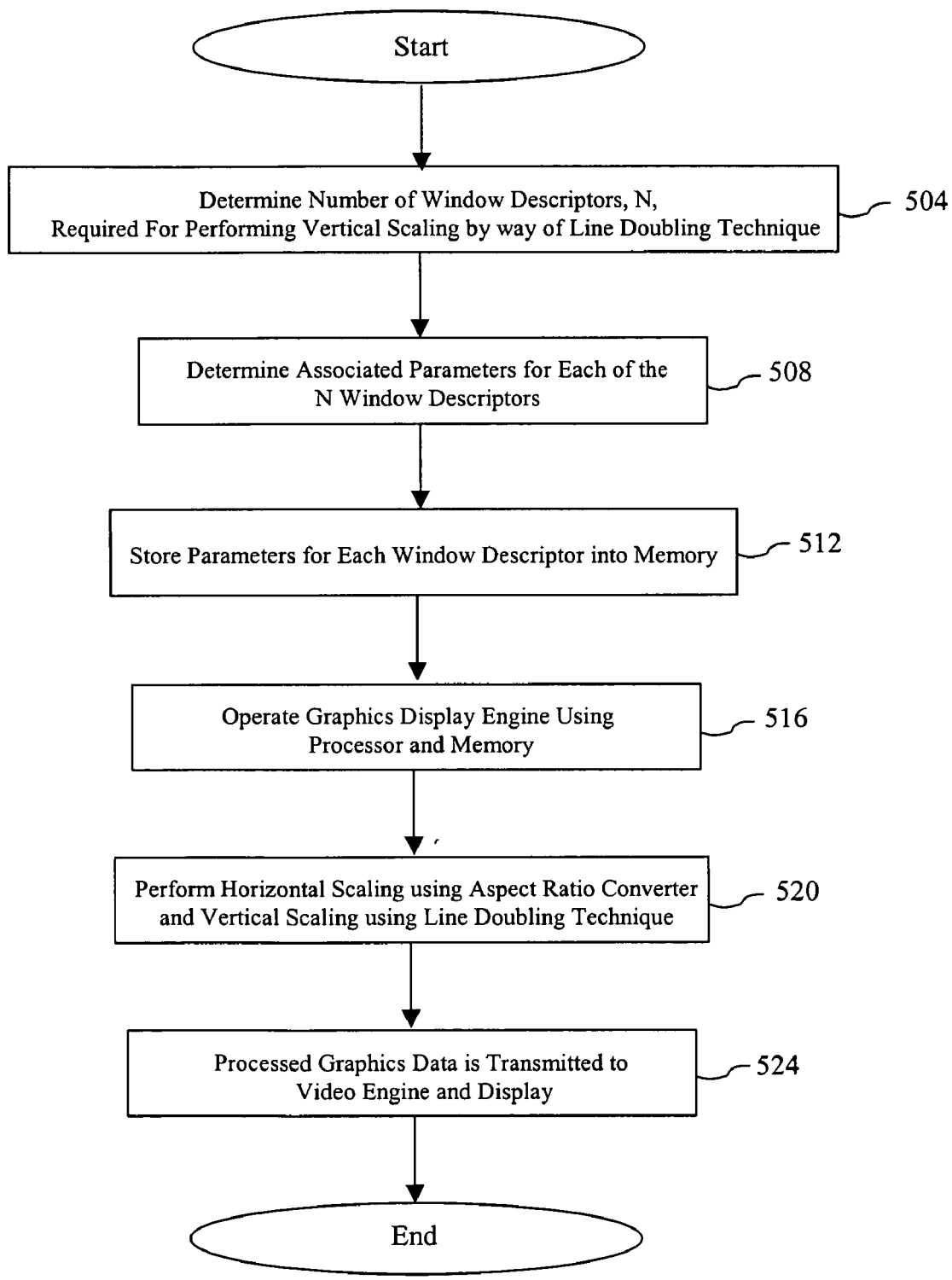
FIG. 5 is an operational flow diagram describing how low resolution graphics data may be displayed on a high resolution display, in accordance with an embodiment of the invention.

FIG. 5 is an operational flow diagram describing how low resolution graphics data may be displayed on a high resolution display, in accordance with an embodiment of the invention. In a representative embodiment, a 320×240 graphics pixel map is vertically and horizontally scaled up in order to display 640×480 pixels on a display having a native resolution of 640×480 pixels. At step 504, the number of window descriptors, N, is determined by the GSCWD such that an appropriate vertical scaling of the 320×240 graphics pixel map may occur. In a representative embodiment, the graphics pixel map may be vertically scaled upwards such that it is properly displayed on a display having 640×480 pixels of resolution. In this representative embodiment, the vertical scaling or line doubling technique is accomplished using N=240 window descriptors (i.e., 240 graphics pixel maps or surfaces). At step 508, the GSCWD determines the values of one or more parameters associated with each of the one or more window descriptors. For example, the one or more parameters are configured such that each window descriptor has its pitch parameter set to zero. Because the pitch is set to zero, each horizontal line is read twice such that the number of horizontal scan lines are doubled, effectively doubling the vertical resolution. In this representative embodiment, the number of lines displayed is doubled from 240 to 480. At step 512, the one or more parameters are stored into a memory (such as that indicated by element 108 in FIG. 1). Next, at step 516, the one or more parameters, for each of the exemplary 240 window descriptors, are read and processed by the graphics engine (as described in relation to FIG. 1) using the processor (as described in relation to FIG. 1) and memory. At step 520, horizontal scaling is accomplished using the graphics engine by way of its internal graphics processor and converter (as described in relation to FIG. 2). Additionally, vertical scaling is accomplished by way of the line doubling technique as previously described. Thereafter, at step 524, the processed graphics pixel maps are transmitted to the video engine and display such that the maps or surfaces may be further combined with background color and video data.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A method of displaying a graphics pixel map onto a display comprising:
generating one or more window descriptors for representing said graphics pixel map;
processing said one or more window descriptors to generate a processed output that conforms to a native resolution of said display, said one or more window descriptors processed using one or more parameters; and
transmitting said processed output for displaying onto said display.

2. The method of claim 1 wherein said one or more window descriptors is received from a memory through a data bus.

3. The method of claim 1 wherein said graphics pixel map defines a surface having said resolution that is lower than that of said native resolution of said display.

4. The method of claim 1 wherein said processing comprises vertical scaling.

5. The method of claim 1 wherein said resolution of said graphics pixel map is equal to 320×240 pixels and said native resolution of said display is equal to 640×480 pixels, and said one or more window descriptors comprises a total of 240 window descriptors.

6. The method of claim 5 wherein said one or more parameters comprises a pitch, said pitch equal to a difference in memory addresses between the first pixels of two consecutive horizontal scan lines.

7. The method of claim 6 wherein said pitch is set to value equal to zero such that a line doubling mechanism is implemented resulting in 2× vertical scaling with half the vertical resolution.

8. The method of claim 5 wherein each of said 240 window descriptors defines two consecutive horizontal scan lines of said 640×480 native resolution display.

9. A method of displaying a graphics pixel map onto a display, said method comprising:
generating a plurality of window descriptors, each of said plurality of window descriptors representing a portion of said graphics pixel map, each of said plurality of windows descriptors comprising one or more parameters;
processing said plurality of window descriptors and said one or more parameters of said graphics pixel map to generate an output; and
displaying said output onto said display.

10. The method of claim 9 wherein said graphics pixel map has a resolution of 320×240 pixels and said display has a resolution of 640×480 pixels.

11. The method of claim 10 wherein said processing effectuates a reduction in vertical resolution by way of redisplaying each of one or more horizontal scan lines.

12. The method of claim 9 wherein said one or more parameters comprises a pitch, said pitch used to index a row of pixels associated with a next horizontal scan line when said output is displayed, said pitch corresponding to a difference in memory addresses between the first pixels of two consecutive horizontal scan lines of said graphics pixel map.

13. A system comprising:
a graphics engine;
a memory;
a processor used to execute one or more instructions stored in said memory, said memory storing one or more window descriptors used for displaying a graphics surface having a first resolution onto a display having a second resolution, wherein said graphics engine, said memory, and said processor are communicatively coupled by way of a data bus.

14. The system of claim 13 wherein said second resolution is higher than that of said first resolution.

15. The system of claim 13 wherein said first resolution comprises 320×240 pixels while said second resolution comprises 640×480 pixels.

16. The system of claim 13 wherein said graphics engine comprises:
a controller used for fetching one or more window descriptors from said memory; and
a graphics processor and converter used for scaling said graphics pixel map.

17. The system of claim 13 wherein said one or more window descriptors used for processing said graphics pixel map provides vertical scaling.

18. The system of claim 17 wherein said vertical scaling scales said graphics pixel map from 240 horizontal lines to 480 horizontal lines.

19. The system of claim 13 wherein said one or more window descriptors comprises a parameter that indicates a starting location or an ending location of a pixel.

20. The system of claim 13 wherein said one or more window descriptors comprises a parameter that indicates a layer number of a particular surface of one or more surfaces, said particular surface used to formulate a video image to be displayed on said display.

21. The system of claim 20 wherein said one or more window descriptors comprises a parameter that specifies a weighting factor of said particular surface.

22. The system of claim 13 wherein said one or more window descriptors comprises a parameter that specifies a difference between the first pixel of a first horizontal scan line and a first pixel of a second horizontal scan line of said graphics surface.

23. A method of displaying a graphics pixel surface comprising:
dividing said graphics pixel surface into a first number of window descriptors equal to a first vertical resolution of said graphics pixel surface; and
displaying said graphics pixel surface onto a display having a second number equal to a second vertical resolution of said display, said second number equal to twice said first number, wherein a corresponding horizontal scan line associated with each of said window descriptors is consecutively displayed twice.

24. A system comprising:
a circuitry for:
fetching a parameter from a memory, said circuitry communicatively coupled to said memory using a data bus;
dividing a graphics pixel surface into a first number of window descriptors wherein said first number corresponds to a first vertical resolution of said graphics pixel surface; and
displaying said graphics pixel surface onto a display having a second number that corresponds to a second vertical resolution of said display, said second number equal to twice said first number, wherein a corresponding horizontal scan line associated with each of said window descriptors is consecutively displayed twice based on using said parameter.

25. A system comprising:
at least one circuitry operable for, at least:
generating one or more window descriptors for representing said graphics pixel map;
processing said one or more window descriptors to generate a processed output that conforms to a native resolution of said display, said one or more window descriptors processed using one or more parameters; and
transmitting said processed output for displaying onto a display.

* * * * *